United States Patent
Chun et al.

(10) Patent No.: US 7,639,767 B2
(45) Date of Patent: Dec. 29, 2009

(54) METHOD OF OBTAINING TIME SYNCHRONIZATION IN OFDM MOBILE COMMUNICATION SYSTEM

(75) Inventors: Jin Young Chun, Seoul (KR); Bin Chul Im, Ansan-si (KR)

(73) Assignee: LG Electronics Inc., Seoul (KR)

( * ) Notice: Subject to any disclaimer, the term of this patent is extended or adjusted under 35 U.S.C. 154(b) by 489 days.

(21) Appl. No.: 11/570,327

(22) PCT Filed: Jun. 10, 2005

(86) PCT No.: PCT/KR2005/001753

§ 371 (c)(1),
(2), (4) Date: Dec. 8, 2006

(87) PCT Pub. No.: WO2005/120182

PCT Pub. Date: Dec. 22, 2005

(65) Prior Publication Data

US 2008/0063096 A1    Mar. 13, 2008

(30) Foreign Application Priority Data

Jun. 10, 2004    (KR) .................... 10-2004-0042649

(51) Int. Cl.
*H04L 7/00*    (2006.01)
(52) U.S. Cl. ..................................... 375/355
(58) Field of Classification Search ................. 375/260, 375/354, 357, 369, 372, 373, 374, 355, 366; 370/395.62, 507; 455/265; 702/89; 713/375, 713/400
See application file for complete search history.

(56) References Cited

U.S. PATENT DOCUMENTS

2004/0131011 A1 *    7/2004    Sandell et al. .............. 370/210

FOREIGN PATENT DOCUMENTS

EP          0 939 527 A1    9/1999
WO       WO 00/77961 A1    12/2000

OTHER PUBLICATIONS

Bo et al., Symbol Synchronization Technique in COFDM Systems, IEEE, vol. 50, No. 1, Mar. 2004, p. 56-62.*

* cited by examiner

*Primary Examiner*—Sam K Ahn
(74) *Attorney, Agent, or Firm*—Lee, Hong, Degerman, Kang & Waimey

(57) ABSTRACT

A method of acquiring time synchronization and supporting method for the same are provided. The present invention enables early synchronization of a receiving side with a transmitting side by avoiding time delays that may result in detecting a current preamble signal. The current preamble signal is inserted with a uniform interval to allow the receiving side to tune its time synchronization with the transmitting side or measure a signal strength in the orthogonal frequency division multiplexing (OFDM) or orthogonal frequency division multiple access (OFDMA) wireless communication system. In an OFDM or OFDMA wireless communication system, the present invention includes modulating a number of reference signals for time synchronization acquisition in a receiving side using at least one of a number of subcarriers and continuously transmitting at least one reference signal modulated by at least one subcarrier to the receiving side during at least one symbol time.

13 Claims, 6 Drawing Sheets

FIG. 6A
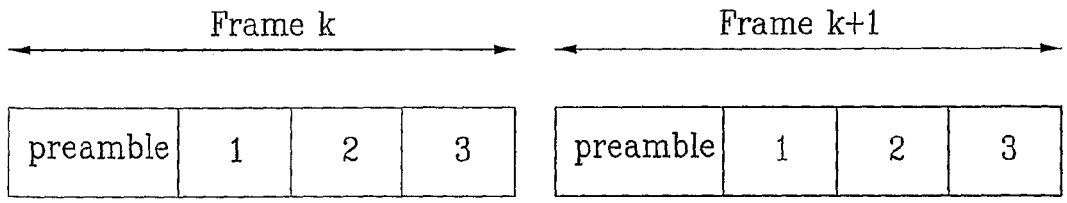
FIG. 6B
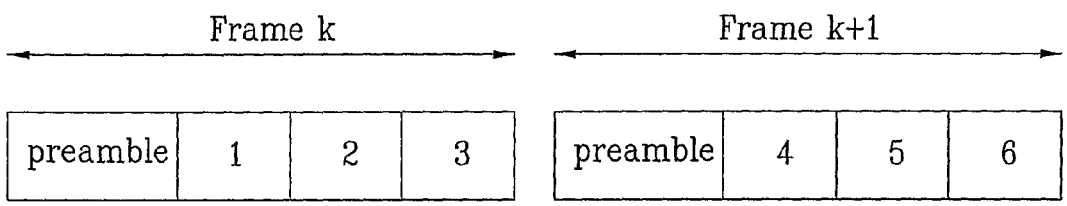
FIG. 7
| | Time(symbol) → | | | | | | | | | |
|---|---|---|---|---|---|---|---|---|---|---|
| 141 | 0 | 0 | 0 | 0 | 0 | 0 | 0 | 0 | 0 | ... |
| 142 | 0 | 0 | 0 | 0 | 0 | 0 | 0 | 0 | 0 | ... |
| 143 | 0 | 0 | 0 | 0 | 0 | 0 | 0 | 0 | 1 | ... |
| 144 | 0 | 0 | 0 | 0 | 1 | 1 | 1 | 1 | 0 | ... |
| 145 | 0 | 0 | 1 | 1 | 0 | 0 | 1 | 1 | 0 | ... |
| 146 | 0 | 1 | 0 | 1 | 0 | 1 | 0 | 1 | 0 | ... |
Subcarrier index ↓

METHOD OF OBTAINING TIME SYNCHRONIZATION IN OFDM MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 10-2004-0042649, filed on Jun. 10, 2004, the contents of which are hereby incorporated by reference herein in its entirety.

TECHNICAL FIELD

The present invention relates to an OFDM (orthogonal frequency division multiplexing) or OFDMA (orthogonal frequency division multiple access) wireless communication system, and more particularly, to a method of acquiring time synchronization and supporting method for the same. Although the present invention is suitable for a wide scope of applications, it is particularly suitable for a receiving side to be synchronized with a transmitting side at an early stage by settling a problem of consuming time in finding to read a current preamble signal inserted with a uniform interval in case that the receiving side tunes its time synchronization with that of the transmitting side or measures a signal strength in the OFDM or OFDMA wireless communication system.

BACKGROUND ART

Recently, many efforts are made to research and develop the OFDM(A) system suitable for fast data transfer in wire/wireless channel. In the OFDM(A) system, a plurality of carrier waves having mutual orthogonality are used to raise a frequency use efficiency. A process of modulating/demodulating a plurality of the carrier waves in a transmitting/receiving end brings about the same result of performing IDF(inverse discrete Fourier transform)/DFT(discrete Fourier transform) to enable fast implementation using IFFT(inverse fast Fourier transform)/FFT(fast Fourier transform).

A principle of PFDM is to reduce relative dispersion in a time domain by a multi-path delay spread in a manner of dividing a fast data stream into a plurality of slow data streams and simultaneously transmitting the slow data streams via a plurality of subcarriers to increase a symbol duration. So, data transmission according to the OFDM system is carried out by a unit of transmission symbol.

Since modulation/demodulation in the OFDM system can be collectively handled for all subcarriers using DFT (discrete Fourier transform), it is unnecessary to design a modulator/demodulator for each individual subcarrier.

FIG. 1 is a conceptional diagram of an OFDM modulator/demodulator.

Referring to FIG. 1, a data stream inputted in series is converted to parallel data streams amounting to the number of subcarriers and then transforms each of the parallel data streams by Inverse Discrete Fourier Transform. And, IFFT (inverse fast Fourier transform) is used for fast data handling. The inverse-discrete-Fourier-transformed data is converted to serial data gain and the serial data is then transmitted though frequency conversion. And, a receiving side receives the corresponding signal and then demodulates the received signal in a reverse process.

The related art OFDM wireless communication system tunes time synchronization and frequency synchronization of a base station to those of a user equipment by means of a preamble signal periodically inserted in a data frame.

FIG. 2 is a diagram of a data frame in an OFDMA wireless communication system according to a related art, in which a horizontal axis corresponds to a time axis of symbol unit and in which a vertical axis corresponds to a frequency axis of subchannel unit. And, the subchannel means a bundle of a plurality of subcarriers.

Referring to FIG. 2, all subcarriers are allocated to a preamble to be modulated. And, the preamble is inserted with a uniform interval to become a reference point of entire time. Since all signals transmitted/received between a base station and a user equipment are inserted by taking the preamble as a reference, acquisition of the preamble is the most basic and important work for mutual data communications. For instance, if a moment that a user equipment attempts to tune its time synchronization to that of a base station corresponds to a $(k+13)^{th}$ symbol in FIG. 1, the user equipment is unable to tune its time synchronization to that of the base station until the $(k+30)^{th}$ symbol. The user equipment acquires a preamble at the $(k+30)^{th}$ symbol and then tunes its time synchronization. Since one attempt is not enough to tune the time synchronization satisfactorily in general, the user equipment waits for a next preamble to tune the time synchronization more precisely and repeats this process until a prescribed condition is met.

However, since the preamble is inserted with the uniform interval, it takes a long time for the user equipment to tune the time synchronization until the preamble is read. Since it is difficult to tune the time synchronization with one acquisition of the preamble, the corresponding process needs to be repeated several times. Hence, it takes to much time to acquire the preamble. Moreover, if it takes a much time to tune the time synchronization, a preparation for communications is delayed, the power consumption of the user equipment is wasted, and a connection delay to a neighbor target base station in handoff is prolonged to degrade a quality of communications.

DISCLOSURE OF THE INVENTION

Accordingly, the present invention is directed to a method of acquiring time synchronization and supporting method for the same that substantially obviate one or more of the problems due to limitations and disadvantages of the related art.

An object of the present invention is to provide a method of acquiring time synchronization and supporting method for the same, by which the necessary time for tuning time synchronization between a transmitting side and a receiving side can be reduced and by which power consumption of a user equipment can be lowered in a manner of reducing unnecessary symbol search performed until a preamble is acquired.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in an OFDM (orthogonal frequency division multiplexing) or OFDMA (orthogonal frequency division multiple access) wireless communication system, a time synchronization acquisition supporting method according to the present invention includes the steps of modulating a plurality of reference signals for time synchronization acquisition in a receiving side via a part of total subcarriers and transmitting the at least one reference signal modulated by the part of total subcarrier to the receiving side continuously during at least one symbol time.

To further achieve these and other advantages and in accordance with the purpose of the present invention, in an OFDM (orthogonal frequency division multiplexing) or OFDMA (orthogonal frequency division multiple access) wireless communication system, a time synchronization acquiring method according to the present invention is characterized in that a transmitting side allocates at least one of entire subcarriers to a reference signal including information indicating a symbol time and modulates to transmit the reference signal and in that a receiving side receives the modulated signal to acquire time synchronization from the reference signal.

To further achieve these and other advantages and in accordance with the purpose of the present invention, in an OFDM (orthogonal frequency division multiplexing) or OFDMA (orthogonal frequency division multiple access) wireless communication system, a time synchronization acquisition supporting method includes the steps of modulating a preamble by entire subcarriers and transmitting the modulated preamble to a receiving side, modulating a plurality of reference signals for time synchronization acquisition in the receiving side via a part of the entire subcarriers, and transmitting the at least one reference signal modulated by the part of total subcarriers to the receiving side continuously during at least one symbol time to which the preamble is not allocated.

To further achieve these and other advantages and in accordance with the purpose of the present invention, in an OFDM (orthogonal frequency division multiplexing) or OFDMA (orthogonal frequency division multiple access) wireless communication system, a time synchronization acquiring method includes the steps of receiving at least one reference signal modulated by a part of entire subcarriers from a transmitting side continuously during at least one symbol time and acquiring time synchronization with the transmitting side from the at least one reference signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6A and FIG. 6B are exemplary diagrams of configurations of symbol time including a reference signal according to the present invention; and FIG. 7 is a diagram of an example of allocating a reference signal according to the present invention.

BEST MODE FOR CARRYING OUT THE INVENTION

Reference will now be made in detail to the preferred embodiments of the present invention, examples of which are illustrated in the accompanying drawings.

First of all, time synchronization acquiring methods applicable to an OFDM or OFDMA wireless communication system according to preferred embodiments of the present invention are explained with reference to the attached drawings as follows.

Figure 1:
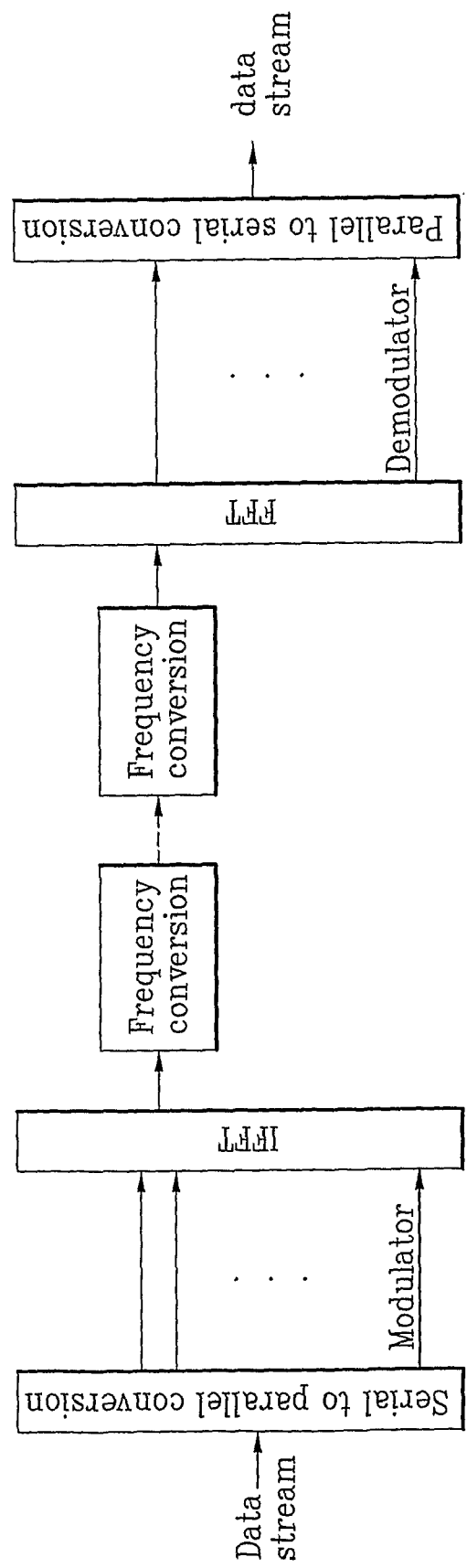
FIG. 1 is a conceptional diagram of an OFDM modulator/demodulator.
Figure 2:
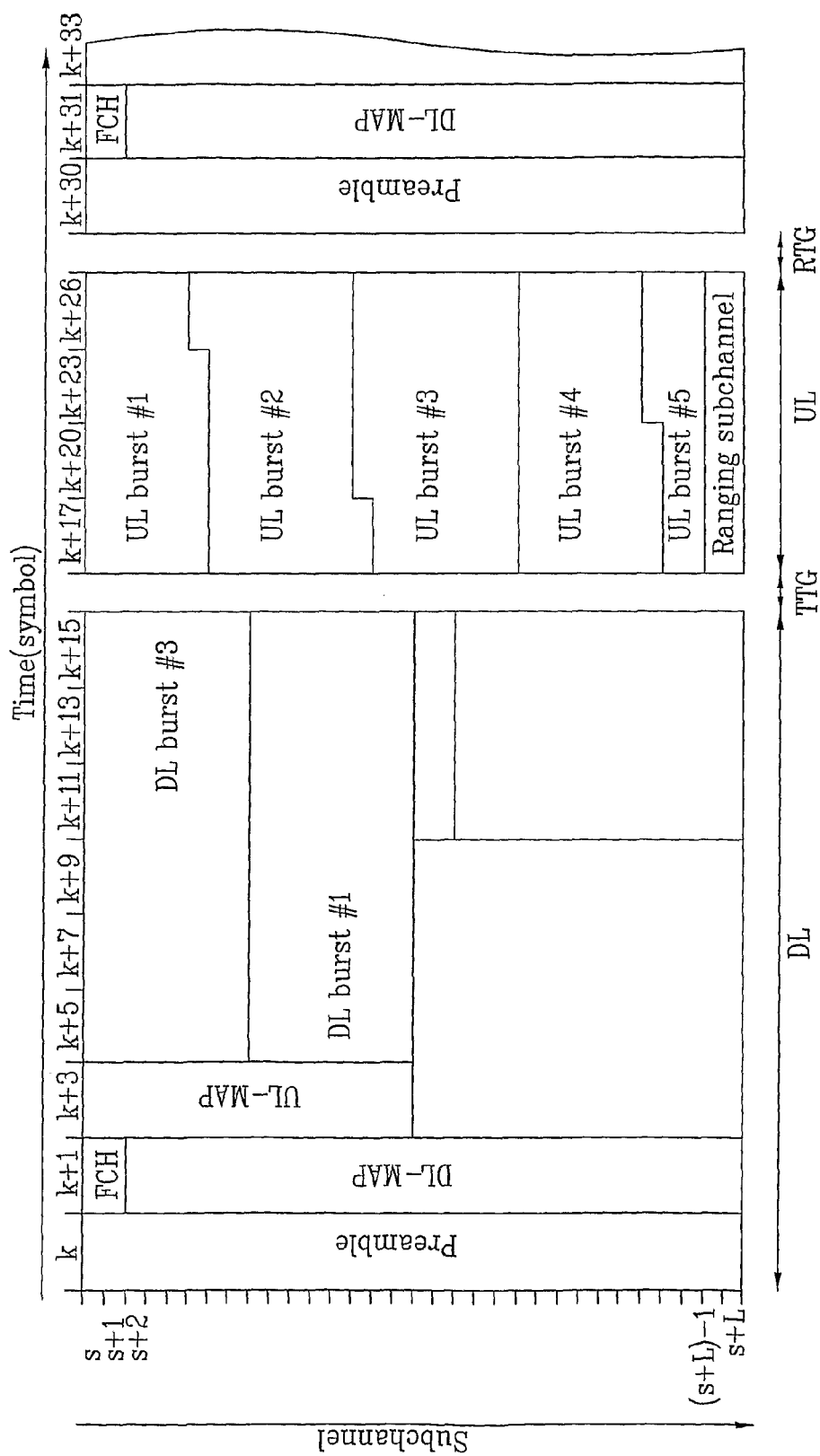
FIG. 2 is a diagram of a data frame in an OFDMA wireless communication system according to a related art.
Figure 3:
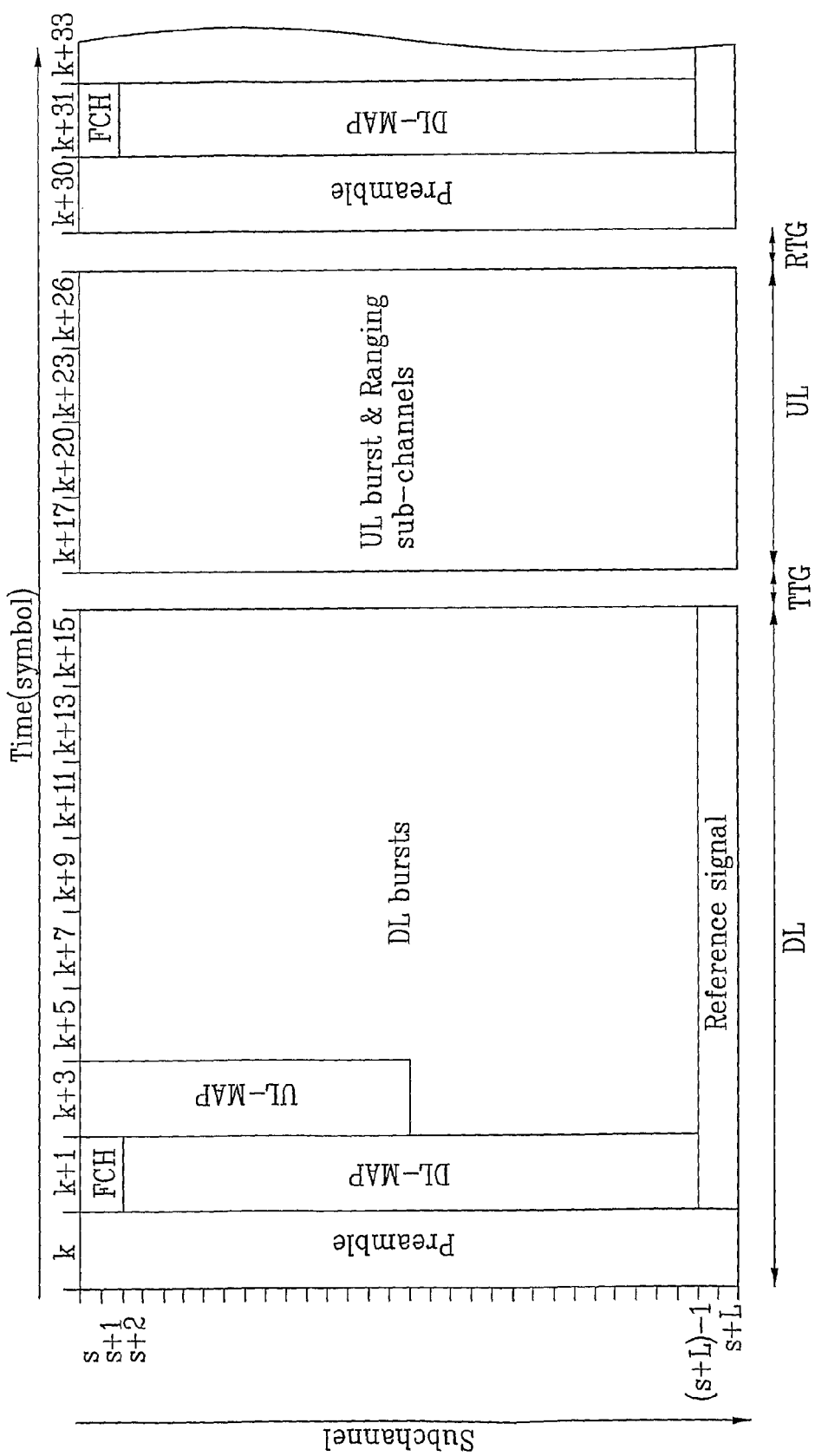
FIG. 3 is a diagram of a data frame in an OFDMA wireless communication system according to one embodiment of the present invention.

FIG. 3 is a diagram of a data frame in an OFDMA wireless communication system according to one embodiment of the present invention. In particular, FIG. 3 shows a configuration of a data frame that a data stream is transformed by IFFT according to OFDMA modulation, in which a horizontal axis corresponds to a time axis of symbol unit and in which a vertical axis corresponds to a subcarrier axis of subchannel unit.

Referring to FIG. 3, FCH (frame control header) is a header. DL-AMP is a message including information of a modulation method and the like for data (DL bursts) that are transferred in downlink. UL-MAP is a message including information for data (UL bursts) that are to be transferred in uplink. TTG (transmit/receive transition gap) is a gap in transforming from downlink data transmission to uplink data transmission. And, RTG (receive/transmit transition gap) is a gap in transforming from uplink data transmission to downlink data transmission.

One preferred embodiment of the present invention shown in FIG. 3 is characterized in that subchannels (subcarriers belonging to (s+L)−1 and (s+L) subchannels in FIG. 3) available for the OFDMA system are used in part for the allocation of a new reference signal. The reference signal includes information indicating that a corresponding symbol corresponds to which ordinal symbol in a transmission frame. Although the preamble in the related art OFDMA system is inserted to leave a uniform interval in-between, it is preferable in the preferred embodiment of the present invention that the new reference signal is inserted for several symbol times (($(k+1)^{th}$ symbol to $(k+15)^{th}$ symbol)) across a predetermined time of a downlink.

In this case, the reference signal can be transferred in a manner of being carried on at least one subcarrier during at least one symbol time.

Assuming that the symbol number excluding a preamble in a downlink data frame is '$N_{DLS}$', an index of the corresponding symbols can be expressed by a minimal bits M that meets '$N_{DLS} \leq 2^M$'. The M bits can be expressed using M subcarriers. If 'R' is defined as a coding rate or a repetition count, R*M subcarriers can be allocated to the reference signal. There exists one reference signal (even if the reference signal can be repeatedly carried, it means that one reference signal is just repeated). The reference signal can be transferred using neighbor subcarriers or dispersed subcarriers.

Hence, the reference signal is constructed with an index expressing a sequence of the symbols $0 \sim N_{DLS}$, whereby it can be known that a prescribed symbol corresponds to which ordinal symbol from the preamble. In this case, any permutation indicating the symbol number is usable as the index.

For instance, numerical figures $0 \sim N_{DLS}$ are usable as they are or a PN code and the like can be used.

The reference signal can be defined by a predetermined progression to express the symbol time among the entire time. For instance, the sequence of 1, 2, 3, . . . can be granted to the symbols following the preamble.

In order for a user equipment to be synchronized with a base station, synchronization can be tuned to a random symbol in downlink using a cyclic prefix that is a major characteristic of the OFDM symbol. The cyclic prefix means that a null signal or a portion of a rear part of the corresponding symbol is added to one symbol in front of the corresponding symbol.

Preferably, a position of the reference signal on the subchannel axis is previously defined between the base station and the user equipment. If a subchannel in which the reference signal is inserted read in the time-synchronized symbol, it is able to know the corresponding symbol corresponds to a which ordinal symbol from a specific reference point since the subchannel includes the information indicating that the corresponding symbol corresponds to a which ordinal symbol in a transmission frame. Hence, the time synchronization can be tuned. To obtain more precise time synchronization, it is preferable that the symbol synchronization acquiring process is repeated several times.

Figure 4:
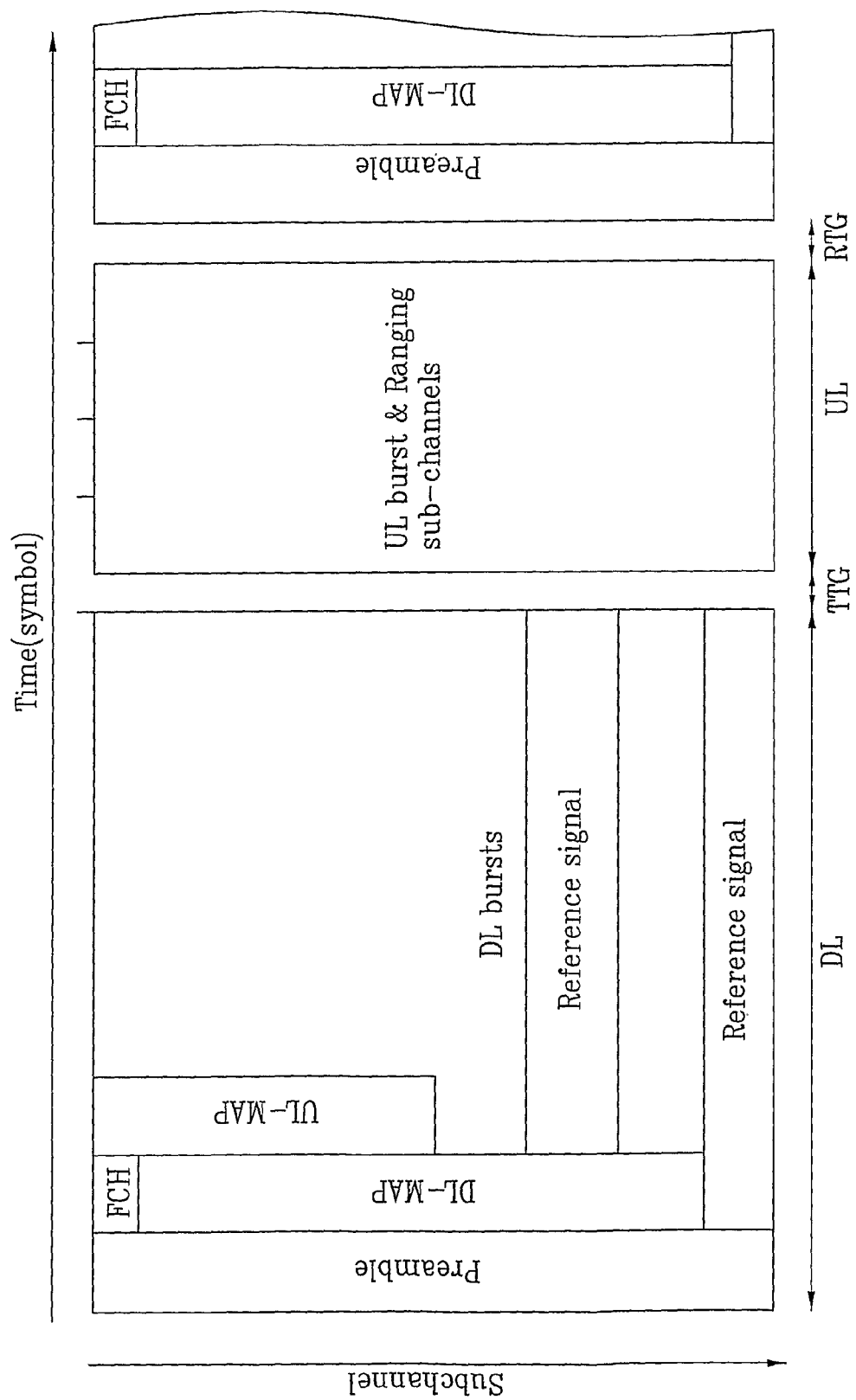
FIG. 4 is a diagram of a data frame in an OFDMA wireless communication system according to another embodiment of the present invention.

FIG. 4 is a diagram of a data frame in an OFDMA wireless communication system according to another embodiment of the present invention. The reference signal, as shown in FIG. 3, can be allocated to the neighbor subchannel. Alternatively, the reference signal, as shown in FIG. 4, is divided to be inserted in subchannels remote from each other, respectively. And, a plurality of subchannels can be allocated to the reference signal.

Figure 5:
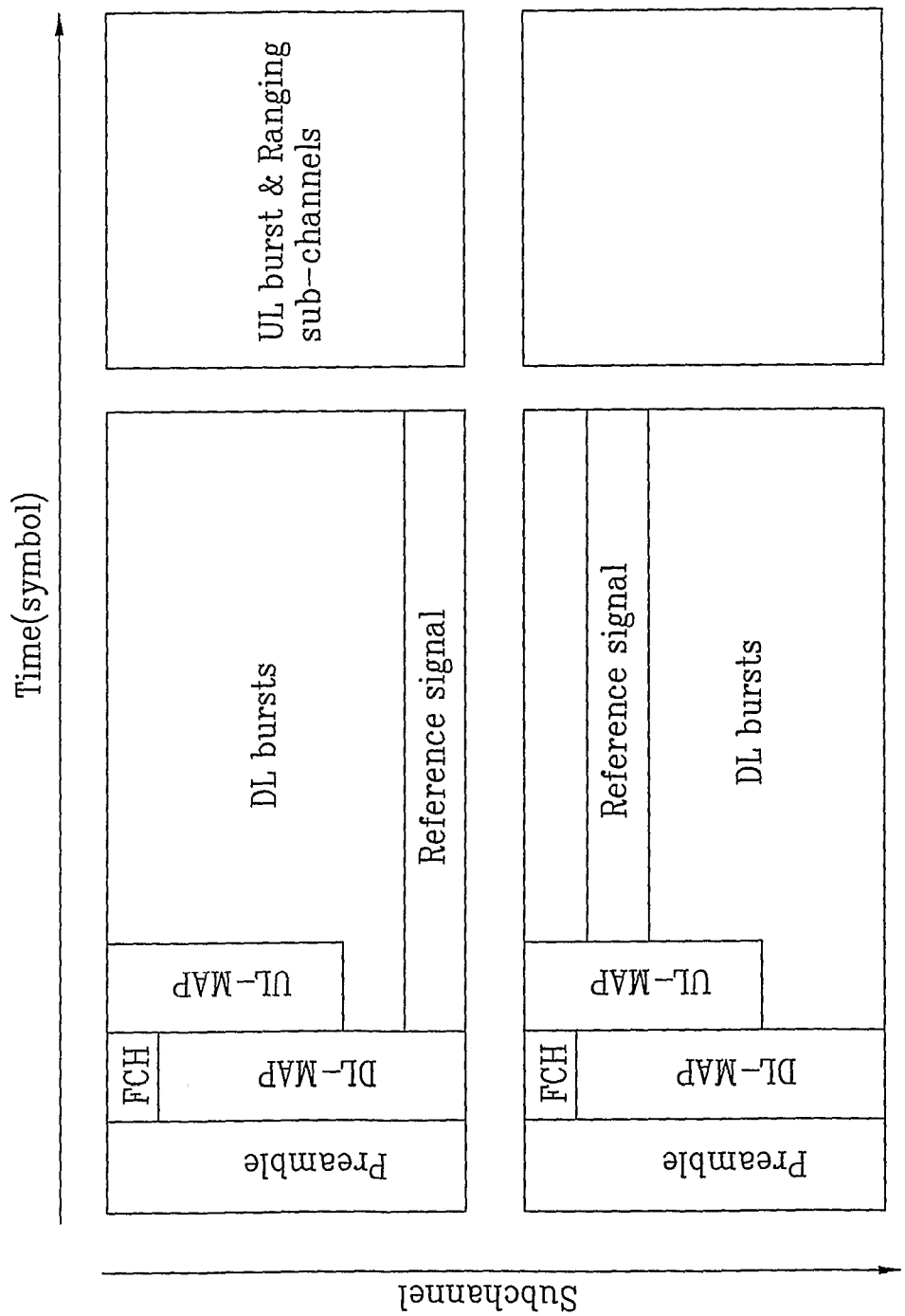
FIG. 5 is a diagram of a data frame in an OFDMA wireless communication system according to a further embodiment of the present invention.

FIG. 5 is a diagram of a data frame in an OFDMA wireless communication system according to a further embodiment of the present invention.

Referring to FIG. 5, in case that an entire band is divided to use due to some reasons, i.e., a reason that one base station supports a multi-sector, it is able to insert the reference signal in the divided bands respectively. In doing so, an inserted position may differ in each of the divided bands. The inserted position of the reference signal may vary according to a symbol number axis or a subchannel axis and may differ in each frame.

The reference signal should contain information indicating a symbol location. The information, as shown in FIG. 6A, informs an absolute accumulative symbol time from a random reference time. The information, as shown in FIG. 6B, can inform an independent symbol time for each frame.

FIG. 7 is a diagram of a substantial implementation of allocating a reference signal according to the present invention.

Referring to FIG. 7, in a environment having a 20 MHz channel bandwidth and 5 ms frame section, subcarriers used for a reference signal among 2,048 subcarriers are grouped into thirty-six 6-groups to be allocated as 141~146, 147~152, 153~158, 1,890~1,895, 1,896~1,901 and 1902~1,907. The reference signal uses BPSK modulation and sequentially expresses binary 000000~111111 using six subcarriers per group. So, the entire groups use the value repeatedly.

INDUSTRIAL APPLICABILITY

Accordingly, the present invention applicable to the OFDM or OFDMA wireless communication system provides the following effects or advantages.

First of all, the necessary time for the time synchronization between the user equipment and the base station can be shortened.

Secondly, by reducing the unnecessary symbol search performed until the acquisition of the preamble, it is able to reduce the power consumption of the user equipment.

Thirdly, the necessary time for acquiring the time synchronization and parameters of the neighbor base station necessary for operations such as handoff and the like is reduced.

Finally, since the new reference signal is inserted in a protection band and the like which is not used in the conventional system, it is able to prevent the configuration and form of the conventional system from being affected.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of supporting time synchronization acquisition in an orthogonal frequency division multiplexing (OFDM) or orthogonal frequency division multiple access (OFDMA) wireless communication system, the method comprising:

modulating a plurality of reference signals for the time synchronization acquisition in a receiving side using a part of a total number of subcarriers, each of the plurality of modulated reference signals comprising position information of a symbol carrying a corresponding reference signal, wherein the position information is absolute accumulative symbol time information from a reference time, wherein the reference time indicates an ordinal symbol on a transmission frame corresponding to the symbol; and transmitting at least one of the plurality of modulated reference signals to the receiving side continuously during at least one symbol time.

2. The method of claim 1, wherein if one of the plurality of reference signals is modulated by a plurality of subcarriers, the plurality of subcarriers are adjacent to each other.

3. The method of claim 1, wherein if one of the plurality of reference signals is modulated by a plurality of subcarriers, the plurality of subcarriers are separated from each other.

4. The method of claim 1, wherein the part of the total number of subcarriers allocated to one of the plurality of reference signals is previously defined between the receiving side and a transmitting side.

5. The method of claim 1, wherein if a transmitting side divides a transmission frequency band into a plurality of divided frequency bands, at least one of the plurality of reference signals is inserted in each of the plurality of divided frequency bands.

6. A method of supporting a time synchronization acquisition in an orthogonal frequency division multiplexing (OFDM) or orthogonal frequency division multiple access (OFDMA) wireless communication system, the method comprising:

modulating a preamble by entire subcarriers and transmitting the modulated preamble to a receiving side;

modulating a plurality of reference signals for time synchronization acquisition in the receiving side using a part of a total number of subcarriers, each of the plurality of modulated reference signals comprising position information of a symbol carrying a corresponding reference signal, wherein the position information is absolute accumulative symbol time information from a reference time, wherein the reference time indicates an ordinal symbol on a transmission frame corresponding to the symbol; and transmitting the plurality of modulated reference signals to the receiving side continuously during at least one symbol time not allocated to the preamble.

7. The method of claim 6, wherein if one of the plurality of reference signals is modulated by a plurality of subcarriers, the plurality of subcarriers are adjacent to each other.

8. The method of claim 6, wherein if one of the plurality of reference signals is modulated by a plurality of subcarriers, the plurality of subcarriers are separated from each other.

9. The method of claim 6, wherein the part of the total number of subcarriers allocated to the plurality of reference signals is previously defined between the receiving side and a transmitting side.

10. The method of claim 6, wherein if a transmitting side divides a transmission frequency band into a plurality of divided frequency bands, the plurality of reference signals are separately inserted in each of the plurality of divided frequency bands.

11. A method of acquiring a time synchronization in an orthogonal frequency division multiplexing (OFDM) or orthogonal frequency division multiple access (OFDMA) wireless communication system, the method comprising:

receiving at least one modulated reference signal that has been modulated by a part of a total number of subcarriers from a transmitting side continuously during at least one symbol time, the at least one modulated reference signal comprising position information of a symbol carrying a corresponding reference signal, wherein the position information is absolute accumulative symbol time information from a random reference time, wherein the reference time indicates an ordinal symbol on a transmission frame corresponding to the symbol; and acquiring time synchronization with the transmitting side from the at least one modulated reference signal.

12. The method of claim 11, wherein the part of the total number of subcarriers allocated to the at least one modulated reference signal is previously defined between a receiving side and the transmitting side.

13. The method of claim 11, wherein if the transmitting side divides a transmission frequency band into a plurality of divided frequency bands, at least one reference signal is inserted in each of the plurality of divided frequency bands.

* * * * *